(12) United States Patent
Desai et al.

(10) Patent No.: US 9,407,297 B1
(45) Date of Patent: Aug. 2, 2016

(54) TECHNIQUES FOR DYNAMICALLY TUNING MOBILE DEVICE ANTENNAS

(71) Applicant: Amazon Technologies, Inc., Reno, NV (US)

(72) Inventors: Jay Praful Desai, San Jose, CA (US); Anuj Dron, San Jose, CA (US); Amit Shailesh Gaikwad, Fremont, CA (US); Felix Liu, San Jose, CA (US); Pratik Kalpesh Patel, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

(21) Appl. No.: 14/300,465

(22) Filed: Jun. 10, 2014

(51) Int. Cl.
*H04B 1/02* (2006.01)
*H04B 1/00* (2006.01)

(52) U.S. Cl.
CPC .................... *H04B 1/0053* (2013.01)

(58) Field of Classification Search
CPC ............................ H04B 1/0053; H04B 1/0458
USPC ......... 455/41.2, 91, 107, 120, 121, 77, 150.1, 455/178.1, 191.1, 193.1
See application file for complete search history.

(56) References Cited

U.S. PATENT DOCUMENTS

| | | | |
|---|---|---|---|
| 2014/0247248 A1* | 9/2014 | Pance | G06F 1/1616 345/174 |
| 2015/0312058 A1* | 10/2015 | Black | H04L 25/0278 455/77 |

* cited by examiner

*Primary Examiner* — Tuan Pham
(74) *Attorney, Agent, or Firm* — Weaver Austin Villeneuve & Sampson LLP

(57) ABSTRACT

Techniques are described for dynamically tuning mobile device antennas. Input derived from multiple sources and representing a variety of scenarios is provided to the RF modem of a mobile device. The modem is configured to select antenna tuning settings based on this input, each of which tunes the antenna by modifying its impedance as appropriate for the corresponding scenario.

18 Claims, 5 Drawing Sheets

TECHNIQUES FOR DYNAMICALLY TUNING MOBILE DEVICE ANTENNAS

BACKGROUND

Mobile device form factors continue to trend smaller and thinner even while the number of options for wireless connectivity and communication using such devices increases. A typical mobile device today supports a variety of such options (e.g., GSM (2G), 3G, 4G, Wi-Fi, Bluetooth, etc.) and must be able to transmit and receive RF energy in many different transmission bands over a wide frequency range (e.g., 700 MHz to 3 GHz); often in more than one band simultaneously. It is a difficult engineering challenge to design an antenna that can transmit and receive RF energy efficiently in so many bands over such a broad frequency range; particularly given the limits on out-of-band harmonic energy specified by FCC regulations. Such harmonic energy corresponds to component frequencies of the RF signal that are integer multiples of the fundamental frequency of the RF signal.

One approach to attenuating this harmonic energy to bring it within acceptable limits is to employ hardware filters (e.g., low-pass or notch filters) to attenuate undesirable out-of-band signal components. However, such hardware solutions negatively impact design size, cost and complexity (e.g., because of the additional hardware components required), as well as have undesirable impacts on other transmission bands (e.g., a filter designed to attenuate energy at a harmonic frequency associated with one band might attenuate energy at the fundamental frequency in another). Another approach is to reduce the overall transmit power under certain conditions for a given transmission band to ensure that related harmonics are within acceptable levels. However, this approach does not take full advantage of the transmission efficiency for which device antennas are typically designed, and can result in performance problems such as, for example, dropped calls and low data throughput.

DETAILED DESCRIPTION

This disclosure describes techniques for dynamically tuning mobile device antennas. Input derived from multiple sources and representing a variety of scenarios is provided to the RF modem of a mobile device. This may include input from the device's application digital signal processor (ADSP) derived from one or more device sensors (e.g., a proximity sensor, motion sensor, light sensor, etc.). It may also include input from the device's operating system derived from any of a variety of sources of information to which the operating system has access and representing any of a variety of scenarios for which modification of the antenna's impedance might be useful. The modem is configured to select antenna tuning settings based on this input, each of which tunes the antenna by modifying its impedance as appropriate for the corresponding scenario. Each of the different RF bands in which the device operates may have its own set of scenarios and corresponding tuning settings.

Figure 1:
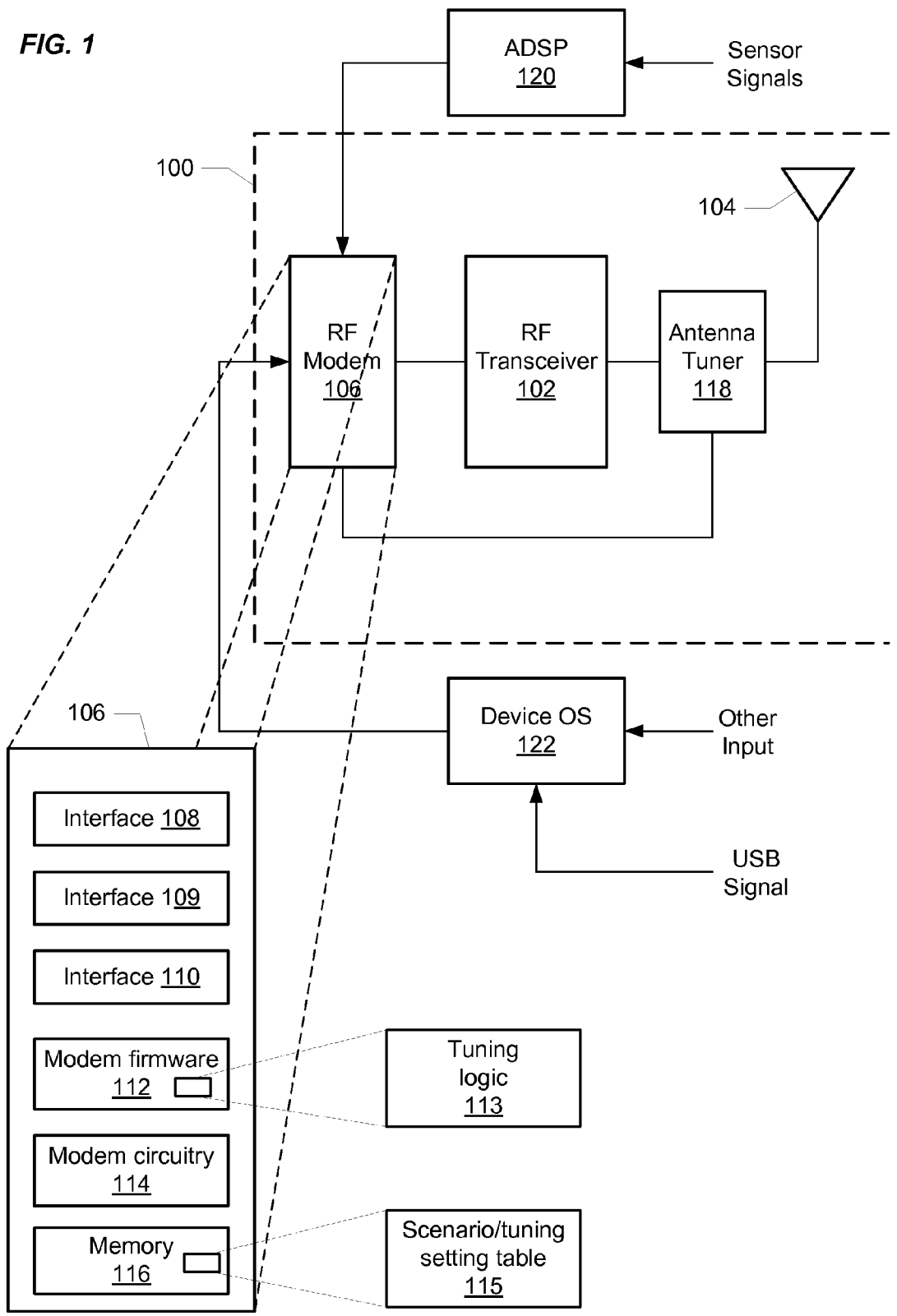
FIG. 1 is a simplified block diagram of an RF module of a mobile device implemented in accordance with a particular embodiment.

FIG. 1 is a block diagram including an example of an RF module that may be used with particular embodiments. RF module 100 may be part of a communication interface(s) (e.g., of a mobile device as described below with reference to FIG. 5) and may operate in parallel with and/or share one or more components with one or more additional RF modules. RF Module 100 includes one or more RF transceivers 102, one or more antennas 104, and an RF modem which modulates and demodulates the RF energy transmitted and received by transceiver(s) 102 via antenna(s) 104. In the following description transceiver(s) 102 and antenna(s) 104 are described in the singular for the sake of brevity and clarity. However, it should be understood that such references should not be used to limit the scope of this disclosure.

RF modem 106 includes modem interfaces 108, 109 and 110, modem firmware 112, modulation/demodulation circuitry 114, and memory 116. In the depicted example, modem interfaces 108 and 110 may be Mobile Industry Processor Interfaces (MIPI®) implemented in accordance with one or more of the standards developed by the MIPI® Alliance. For example, interface 108 enables communication between RF modem 106 and front end RF components (e.g., power amplifiers, low-noise amplifiers, filters, switches, power management modules, etc.) and may be implemented according to the *MIPI Alliance Specification for RFFE* v1.10, the entire disclosure of which is incorporated herein by reference for all purposes. Interfaces implemented according to this specification are control interfaces that support point-to-multipoint connectivity for control of the RF front end. Interface 109 enables communication between RF modem 106 and some baseband components of the mobile device and may be implemented according to the *MIPI Alliance Specification for DigRF$^{SM}$ v4* v1.10, the entire disclosure of which is incorporated herein by reference for all purposes. Interfaces implemented according to this specification are point-to-point interfaces that allow baseband integrated circuits (ICs) to interact with RF ICs. Alternatively, interface 109 may be a proprietary interface provided by the chipset manufacturer of RF modem 106. Modulation/demodulation circuitry 114 communicates with transceiver 102 to facilitate modulation and demodulation of the RF transmitted and received via antenna 104.

Interface 110 enables communication between RF modem 106 and the various device components, processes, or logic involved in identifying antenna tuning scenarios as described herein (e.g., ADSP 120 and Operating System (OS) 122). According to some implementations, interface 110 may be implemented according to one or more of the MIPI® standards. According to a particular class of implementations, interface 110 is a proprietary interface provided by the chipset manufacturer of RF modem 106. It should be noted that although interfaces 109 and 110 are shown as separate interfaces, implementations are contemplated in which they are a single interface.

Modem firmware 112 is configured (e.g., with tuning logic 113) to select from among a plurality of tuning settings (e.g., stored in a scenario/tuning setting table 115 in memory 116) for antenna tuner module 118 to enable tuning of antenna 104 for various scenarios corresponding to the tuning settings. Tuner module 118 includes a variable impedance (e.g., a configurable bank of capacitors) that may be configured in response to the tuning setting selected by tuning logic 113 to modify the impedance of antenna 104 to achieve an antenna characteristic that is appropriate for an identified scenario. For example, the identified scenario might be that a USB plug has been inserted into the mobile device; and this scenario might correspond to a specific transmission band. Other examples include occluded and free space scenarios described below which relate to whether the mobile device is near an external object. In response to the detection or identification of one of these scenarios, the tuning logic selects a tuning setting that modifies the antenna characteristic that was previously determined to be appropriate for that scenario. Tuning logic 113 may employ a different set of tuning settings for each of a plurality of RF bands in which RF module 100 is configured to operate. Each tuning setting is empirically determined under test conditions simulating the corresponding scenario. For example, for the USB plug scenario, the appropriate tuning setting may be determined by inserting a USB plug into the mobile device and measuring the RF output power of the mobile device at the fundamental frequency and one or more harmonic frequencies for each of a plurality of tuning settings. The tuning setting that meets specified or desired performance criteria (e.g., limits on out-of-band harmonic energy specified by FCC regulations) is then stored as the tuning setting for that scenario.

Tuning logic 113 selects the tuning settings based on input from multiple clients that communicate with modem 106 via modem interface 110. These clients may include any of a variety of components, modules, or processes that are part of or operate within the mobile device. According to a particular class of implementations, these clients include ADSP 120 and OS 122.

As mentioned above, ADSP 120 is a companion processing core configured for a variety of functions including sensor management. Sensor management includes processing input from various sensors associated with the mobile device. Each of the device sensors communicates with the ADSP such that when a sensor is triggered, the ADSP sends a message to the appropriate device module. The sensors may include a proximity sensor input (e.g., an infrared sensor) that detects when the mobile device is near an external object (e.g., a user's hand or head). ADSP 120 communicates the state of the proximity sensor to modem 106 via modem interface 110.

Under some conditions, tuning logic 113 is configured to select between two different tuning settings based on the state of the proximity sensor as communicated by ADSP 120, i.e., a free-space tuning setting or an occluded tuning setting. The free-space tuning setting is selected when the proximity sensor indicates that the mobile device is not in proximity to an external object. The occluded tuning setting is used for lower frequency bands and is selected when the proximity sensor indicates that the mobile device is in proximity to an external object. This setting is intended to boost the RF output power at the fundamental frequency for the detected condition. That is, because the impedance of the antenna changes when the device is brought in proximity to another object, the impedance of the antenna is tuned (e.g., using tuner module 118) to account for this and thereby maintain a strong signal.

Figure 2A:
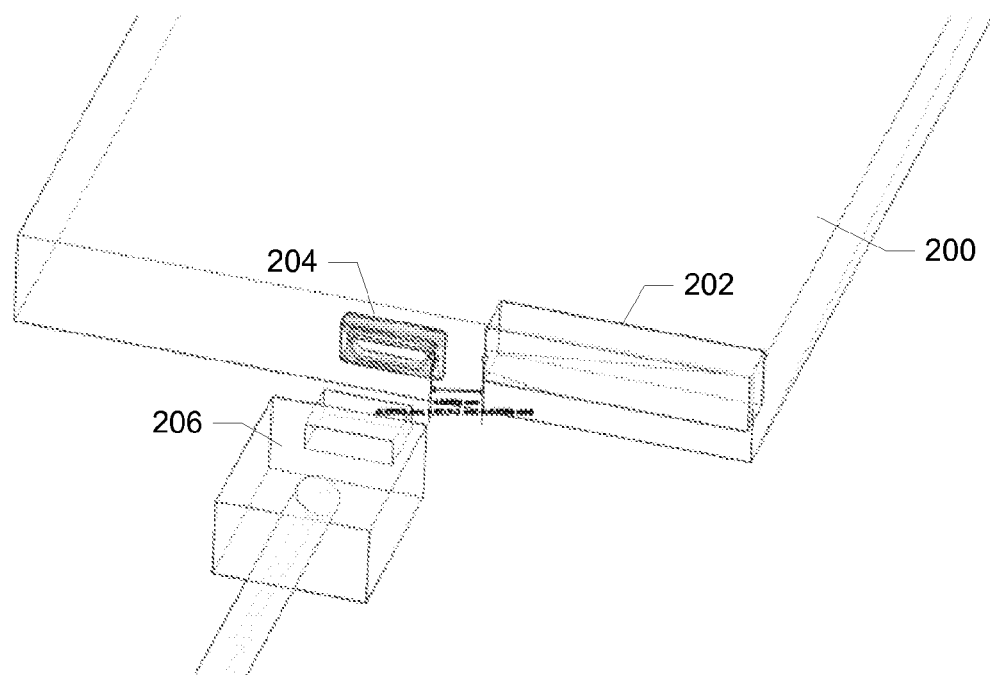
FIGS. 2A and 2B illustrate an antenna of a mobile device optimized for transmission in a particular band in conjunction with the metal of a nearby interface.
Figure 2B:
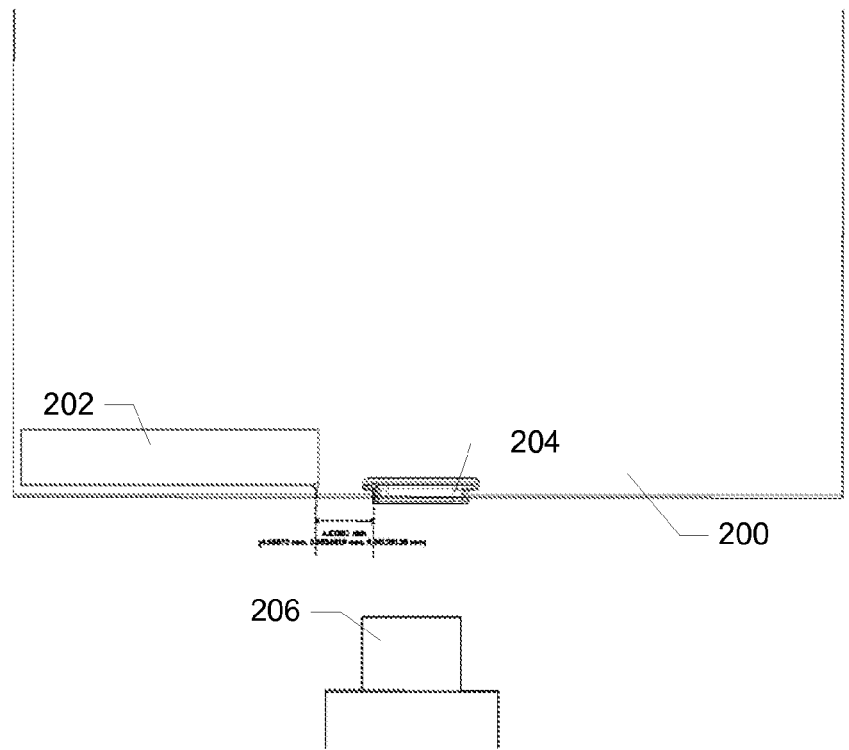

According to a particular implementation, antenna 104 is a low band antenna (e.g., for GSM 850, GSM 900, and WCDMA and LTE low bands) that is configured for efficient transmission at one or more of the low band fundamental frequencies by taking advantage of the proximity of the metal housing of the USB port when the USB port of the mobile device is engaged with a USB plug. An example of such an antenna design is illustrated in FIGS. 2A and 2B. Mobile device 200 (e.g., a tablet, a smart phone, etc.) includes a low band antenna 202 that is positioned in close proximity to USB port 204 such that, when USB plug 206 engages with USB port 204, electromagnetic coupling between the metal housing of USB port 204 and antenna 202 results in an antenna characteristic that boosts the efficiency with which RF energy is transmitted in the GSM 850 band. According to a particular implementation, USB port 204 and USB plug 206 are both USB Micro-B as specified in the *Universal Serial Bus Micro-USB Cables and Connectors Specification, Revision* 1.01, Apr. 4, 2007.

It will be appreciated that the improvement in antenna efficiency, as explained above, for antenna 202 may allow for a smaller form factor for the mobile device in which it is included. However, the total harmonic energy radiated by antenna 202 may also be boosted, resulting in potential desensitization issues for the receivers associated with other bands (e.g., WiFi, 3G, 4G, Bluetooth, etc). That is, boosting harmonic energy relating to one band may make it more difficult for receivers to faithfully capture energy at the fundamental frequency in other bands that are near or include the boosted harmonic frequencies. As will be understood, such desensitization may compromise operation of the device in the affected band(s), e.g., dropped calls, lost data connections, etc.).

Therefore, the presence of a USB plug in the device's USB port corresponds to one or more scenarios for which tuning logic 113 is configured to select one or more corresponding antenna tuning settings. According to a specific implementation, connection of a USB plug is conventionally detected by OS 122 which sends a message to modem 106, in response to which tuning logic 113 selects an appropriate tuning setting for the detected scenario. That is, in addition to ADSP 120, OS 122 is connects with modem 106 and communicates the detection of a USB plug via modem interface 110. The selected tuning setting results in an antenna characteristic that reduces power in one or more harmonics but effects little or no attenuation of energy at the fundamental frequency, i.e., the primary carrier frequency in the band of interest, e.g., 850 or 900 MHz in the GSM band. Different empirically determined tuning settings for this condition may be selected for different RF bands. The condition may also be ignored for some bands, e.g., bands for which the harmonics do not present a receiver desensitization issue.

Figure 3:
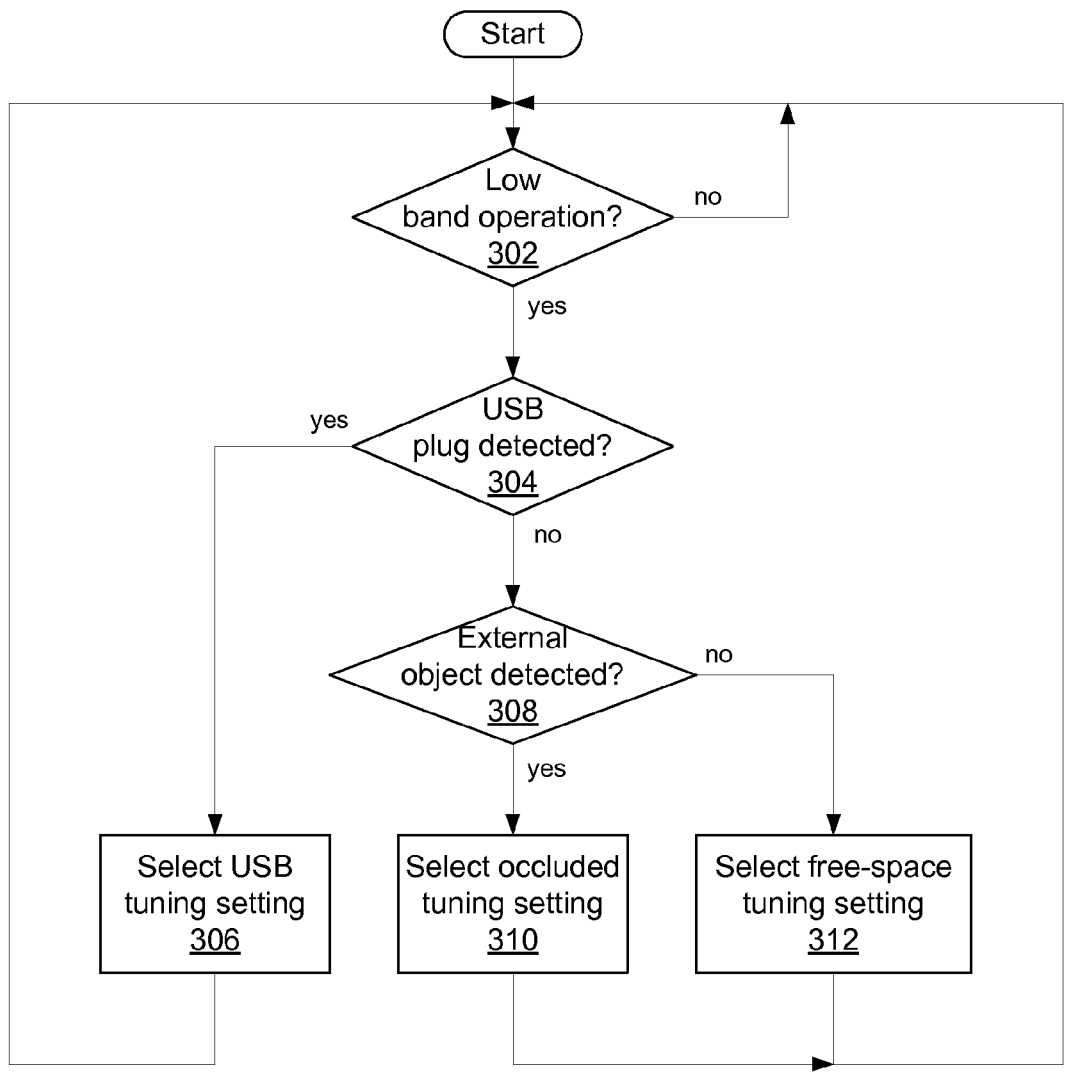
FIG. 3 is a flowchart illustrating operation of a particular implementation.

According to a more specific implementation, when the presence of a USB plug is detected for a particular band, e.g., GSM 850, input from the ADSP regarding the state of the proximity sensor is ignored. That is, the tuning setting for the USB plug scenario is given precedence over the scenario described above corresponding to the occluded state of the proximity sensor. Operation of such an implementation is illustrated in the flowchart of FIG. 3. However, it should be noted that embodiments are contemplated in which more generalized and/or sophisticated decision making is implemented.

In the implementation depicted in FIG. 3, the selection of antenna tuning settings are shown for three low band scenarios; an occluded scenario in which an external object is detected in proximity to the mobile device, a free-space scenario in which no external object is detected, and a USB scenario in which a USB plug is detected in the device's USB port. If the device is determined to be in low band operation (302), e.g., GSM 850, and a USB plug is detected (304), the USB tuning setting is selected (306). As described above, the presence of the USB plug may be communicated by the device's operating system to the RF modem, with the tuning logic of the modem then selecting the corresponding tuning setting.

On the other hand, if no USB plug is detected (304), a determination is made as to whether an external object is near the mobile device (308). If an external object is detected, the occluded tuning setting is selected (310); if not, the free-space tuning setting is selected (312). As described above, the presence of an external object may be communicated by the device's ADSP to the modem based on the state of the device's proximity sensor. As will be appreciated with reference to FIG. 3, for the depicted implementation, the tuning logic by which the tuning setting is determined prioritizes the USB tuning setting, i.e., when a USB plug is detected, the USB tuning setting is selected whether or not an external object is detected. However, as mentioned above, this precedence is merely an example and is not required.

More generally, an infrastructure is described herein by which sophisticated tuning of a mobile device antenna may be accomplished dynamically to meet a variety of requirements and/or design goals. It should be noted that this capability may be particularly advantageous in the context of designing mobile devices having small form factors in which several RF bands need to be supported. Enabling tuning of antenna impedance for a variety of different scenarios based on input from a variety of sources allows dynamic control of highly specific performance characteristics to meet performance and regulatory criteria. Such an approach also allows for adjustments to be made at late stages of product design without significant disruption of product delivery timelines. Moreover, as new scenarios are encountered, tuning settings may be added or modified to handle them; even for devices already in the field. A more generalized representation of the operation of such an infrastructure is depicted in FIG. 4.

Figure 4:
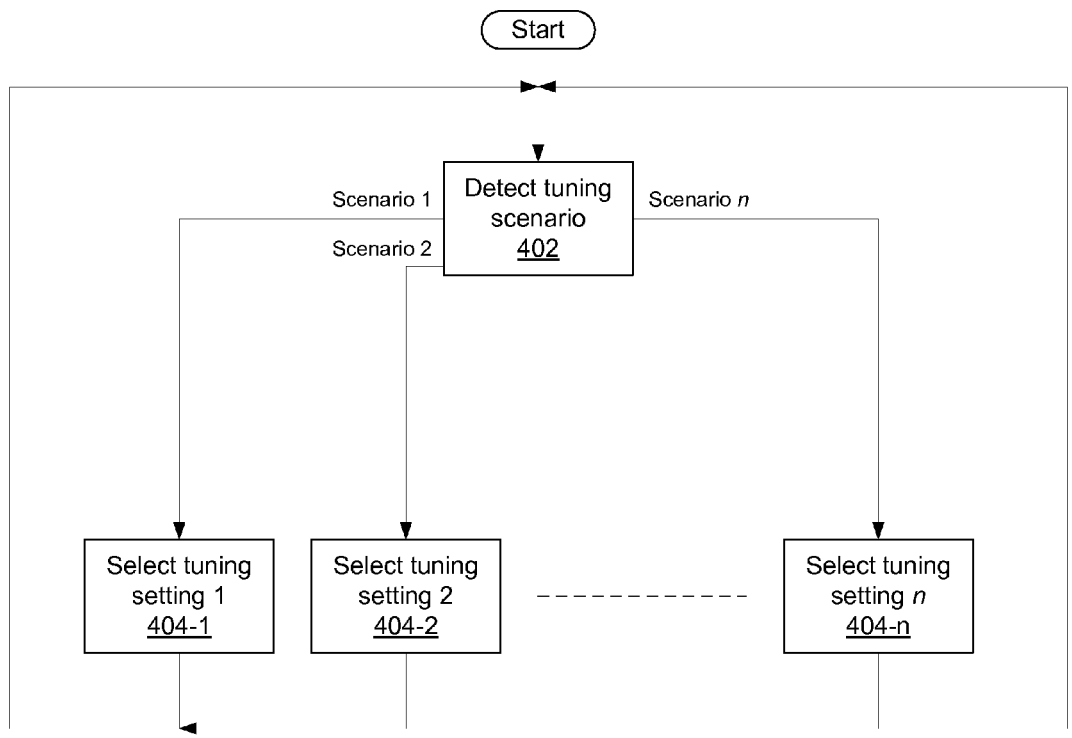
FIG. 4 is a flowchart illustrating operation of another implementation.

The flowchart of FIG. 4 illustrates the detection of a tuning scenario for a mobile device (402) and the selection of one of n tuning settings corresponding to n tuning scenarios (404-1 to 404-n). As will be understood, the tuning logic by which tuning settings are selected may include a priority handling scheme which deals with situations in which multiple scenarios are simultaneously detected. An example of such priority handling is described above with reference to the specific implementation represented in FIG. 3 in which, for a given RF band, the USB tuning setting is given priority over the tuning settings associated with scenarios associated with the proximity sensor input. This is merely one example. Those of skill in the art will appreciate the great diversity of priority handling schemes that may be devised for particular implementations.

The diversity of tuning scenarios for which a corresponding tuning setting might be useful should now be apparent. More generally, any set of inputs or conditions available to a mobile device can be mapped to a tuning scenario and its corresponding tuning setting to dynamically tune an antenna as described herein. For example, in implementations in which the device OS communicates with the modem, any information available to the OS may be communicated (in some form) to the modem for use by the modem's tuning logic in selection of a corresponding tuning setting. As will be appreciated, this allows for input to the modem's tuning logic that may be indicative of scenarios that are unrelated to the sensor triggers managed by the ADSP. Such non-sensor input might include any kind of operational or environmental data relating to or accessible by any subsystem, component, or process of the mobile device such as, for example, the current RF band in which the RF module is operating, signal strength and/or condition, thermal conditions of one or more device components, status of the device's battery, the orientation of the device, motion and/or speed of the device, etc. For example, tuning settings may be provided for specific frequency bands and/or channels within each band. In another example, tuning settings may be provided for different antenna loading conditions, e.g., when an antenna is loaded due to a user's hand or head. In yet another example, tuning settings may be provided for specific frequency bands and/or channels to meet FCC requirements relating to Specific Absorption Rate (SAR), i.e., a measure of the rate at which RF energy is absorbed by the human body.

Non-sensor input might also include contextual data relating to circumstances or conditions external to the mobile device (e.g., location, date, time of day, time of year, humidity, temperature, altitude, proximity to other devices, etc.). Such information might be derived by the device OS and/or one or more external devices. The information used to identify scenarios may even include information retrieved from remote platforms. In one example, the location and or movement of a device (e.g., using GPS, map data, etc.) may be used to select tuning settings for different frequency bands employed in different geographic cellular markets. In another example, environmental and/or climate conditions may be used to select tuning settings that account for differences in electromagnetic propagation for different conditions. The modem itself might also provide input used to select a particular tuning setting. For example, circuitry in the modem might be responsive to temperature, over or under voltage conditions, etc. This information might be used to select a particular setting. And implementations are contemplated in which tuning settings may be selected and used as described herein for tuning antennas operating in any RF band of operation.

The logic governing identification of scenarios and selection of tuning settings (including priority handling) may be represented by a state machine that may be encoded in the modem firmware, in one or more of the modem clients (e.g., the device, the ADSP, etc.), or some combination of these. That is, decision making logic can be encoded in the modem firmware, but might be at least partially implemented elsewhere. For example, the device operating system may be configured with logic that performs most or all of the work of identifying various scenarios, and then transmits a simple, multi-bit scenario ID to the modem for selection of a corresponding tuning setting. The ADSP may also be modified to receive additional input, identify scenarios, make decisions, etc. The decision making logic governing selection of antenna tuning settings might also be hierarchical and/or distributed among the modem and its various clients. The diverse range of alternatives will be apparent to those of skill in the art.

Figure 5:
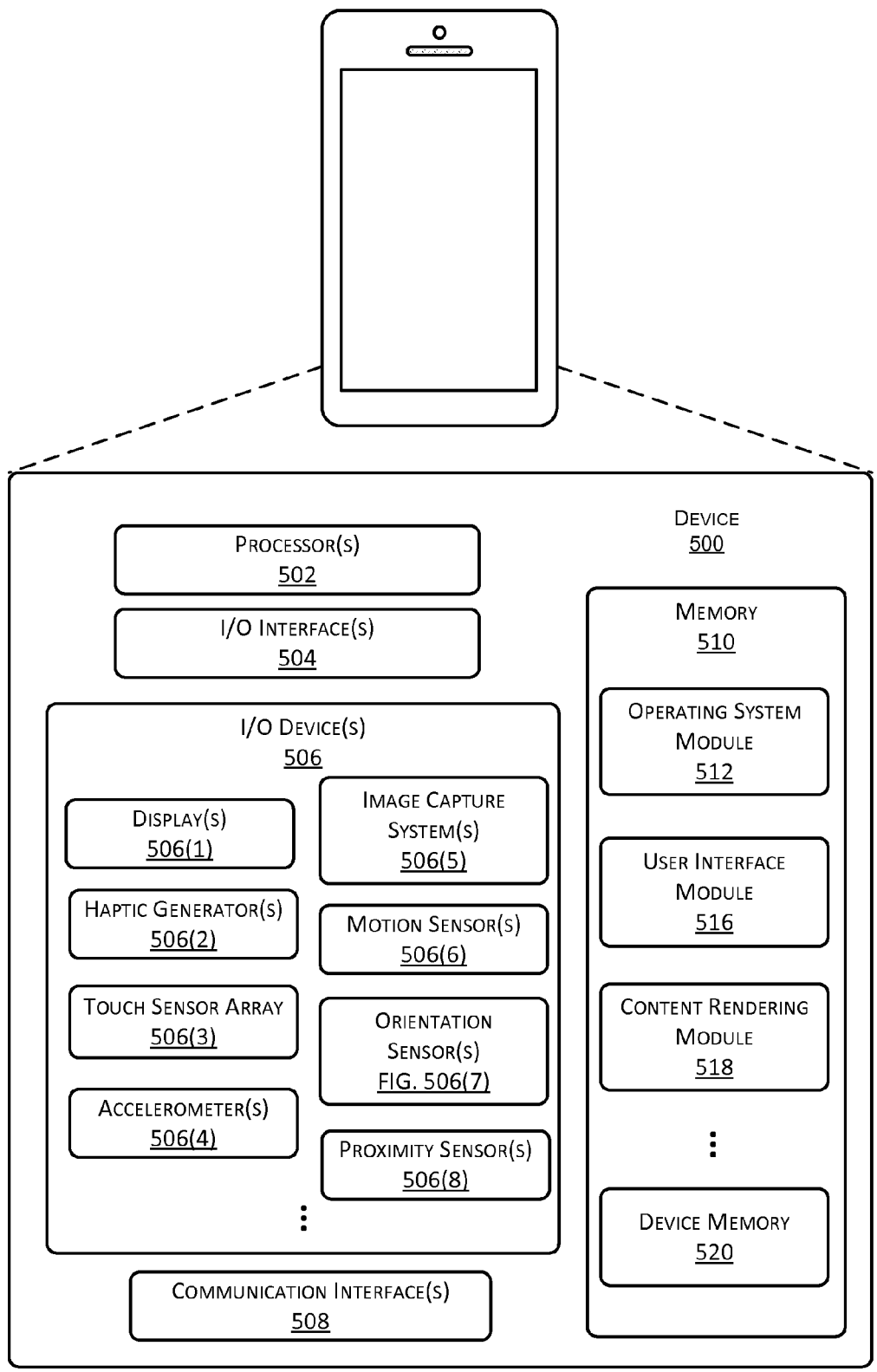
FIG. 5 is a simplified block diagram of a mobile device in which embodiments of the invention may be implemented.

A block diagram of an example of a mobile device 500 in which embodiments of the invention may be implemented is shown in FIG. 5. Device 500 includes one or more single or multi-core processors 502 configured to execute stored instructions (e.g., in device memory 520). Processor(s) 502 may include an ADSP. The ADSP is a companion processing core that operates in parallel with the device's operating system. The ADSP handles sensor management as well as some other digital signal processing functions when the operating system is dormant. For example, the ADSP supports operation of a media player when the operating system is in low power mode.

Device 500 may also include one or more input/output (I/O) interface(s) 504 to allow the device to communicate with other devices. I/O interfaces 504 may include, for example, an inter-integrated circuit (I2C) interface, a serial peripheral interface (SPI) bus, a universal serial bus (USB), an RS-232 interface, a media device interface, and so forth. I/O interface(s) 504 is coupled to one or more I/O devices 506. The I/O device(s) 506 may include one or more displays 506(1), one or more haptic generators 506(2), one or more touch sensor arrays 506(3), one or more accelerometers 506(4), one or more image capture systems 506(5), one or more motion sensors 506(6), one or more orientation sensors 506(7), one or more proximity sensors 506(8), microphones, speakers, and so forth. The one or more displays 506(1) are configured to provide visual output to the user and may comprise any of a variety of display types including, for example, any type of reflective or transmissive display. Touch sensor array 506(3) may be, for example, a capacitive sensor array having a matrix of conductors that are scanned to determine the location, duration, speed and direction of touch events within the matrix based on changes in electrical capacitance.

Device 500 may also include one or more communication interfaces 508 configured to provide communications between the device and other devices. Such communication interface(s) 508 may be used to connect to cellular networks, personal area networks (PANs), local area networks (LANs), wide area networks (WANs), and so forth. For example, communications interfaces 508 may include radio frequency (RF) modules having transmitters and receivers optimized for transmitting and receiving RF energy in each of a plurality of transmission bands, e.g., for GSM (2G or 2.5G) networks, 3G or 4G cellular networks, WiFi LANs, Bluetooth PANs, etc. Device 500 also includes one or more buses or other internal communications hardware or software that allow for the transfer of data and instructions between the various modules and components of the device.

Device 500 also includes one or more memories (e.g., memory 510). Memory 510 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 510 provides storage for computer readable instructions, data structures, program modules, applications, and other data for the operation of device 500. Memory 510 includes at least one operating system (OS) module 512 configured to manage hardware resources such as I/O interfaces 504 and provide various services to applications or modules executing on processor(s) 502. According to a particular class of implementations, operating system module 512 is configured to provide input to one or more of the RF modules of communication interface(s) 508 for dynamic tuning of an associated antenna as described herein. Memory 510 also includes a user interface module 516, a content rendering module 518, and other modules.

Memory 510 also includes device memory 520 to store a wide variety of instructions and information using any of a variety of formats including, for example, flat files, databases, linked lists, trees, or other data structures. Such information may include, for example, code or logic for use in conjunction with the dynamic tuning of antennas as described herein. However, it should be noted that such code or logic may not necessarily reside in memory 520 as it may be included elsewhere in the device, e.g., as part of the operating system, the ADSP firmware, the RF modem firmware, etc. In some implementations, a portion of device memory 520 may be distributed across one or more other devices including servers, network attached storage devices, and so forth.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
using a mobile device, initiating a Global System for Mobile Communications (GSM) communication session in a GSM transmission band;
transmitting RF energy in the GSM transmission band via an antenna of the mobile device;
determining whether the mobile device is near an external object;
selecting either a free-space tuning setting or an occluded tuning setting for the antenna based on whether the mobile device is determined to be near an external object, the free-space tuning setting being for tuning the antenna when the mobile device is not near an external object, and the occluded tuning setting being for tuning the antenna when the mobile device is determined to be near an external object;
modifying an impedance of the antenna based on the free-space tuning setting or the occluded tuning setting;
determining that a Universal Serial Bus (USB) plug has been inserted in a USB port of the mobile device;
selecting a USB tuning setting for the antenna in response to determining that the USB plug has been inserted in the USB port, the USB tuning setting being for tuning the antenna when the USB plug has been inserted in the USB port; and
modifying the impedance of the antenna based on the USB tuning setting;
wherein, while the USB plug remains inserted in the USB port, the impedance of the antenna is maintained with the USB tuning setting regardless of whether the mobile device is determined to be near an external object.

2. The method of claim 1, wherein determining whether the mobile device is near an external object includes:
receiving input from a proximity sensor of the mobile device, and
providing, to a modem of the mobile device via a first mobile industry processor interface, an indication of whether the mobile device is near the external object; and
wherein determining that the USB plug has been inserted in the USB port includes:
determining, by an operating system of the mobile device, that the USB plug has been inserted in the USB port, and
providing, to the modem via a second mobile industry processor interface, an indication that the USB plug has been inserted in the USB port.

3. The method of claim 1, wherein the antenna is configured for efficient transmission of the RF energy in the GSM transmission band when the USB plug is inserted in the USB port.

4. The method of claim 1, wherein the RF energy in the GSM transmission band includes first RF energy associated with a fundamental frequency and second RF energy associated with a plurality of harmonic frequencies, and wherein the USB tuning setting tunes the antenna to attenuate the second RF energy associated with one or more of the harmonic frequencies.

5. A device, comprising:
a transmitter configured to generate a radio frequency (RF) signal in each of a plurality of transmission bands;
a communication port;
an antenna configured to transmit the RF signals generated by the transmitter, the antenna being configured such that, when a connector is mated with the communication port, a transmission efficiency of the antenna in a first transmission band is increased by electromagnetic coupling between the antenna and the connector;
a variable impedance component coupled to the antenna and configured to modify an impedance of the antenna;
tuning logic configured to tune the antenna by selecting from among a plurality of tuning settings for the variable impedance component; and
one or more processors configured to receive input from a plurality of sources, to identify based on the input one or more scenarios from among a plurality of scenarios, each of the scenarios corresponding to one of the tuning settings, and to provide input to the tuning logic regarding the one or more identified scenarios to facilitate selection of a particular tuning setting corresponding to one of the one or more scenarios, wherein a first scenario corresponds to the connector being mated with the communication port, and wherein a first tuning setting corresponding to the first scenario tunes the antenna to attenuate harmonic energy of at least one of the RF signals outside of the first transmission band.

6. The device of claim 5, wherein the one or more processors are configured to run an operating system of the device, wherein the one or more processors include an auxiliary processor that operates when the operating system enters a dormant mode, and wherein both the operating system and the auxiliary processor are configured to communicate with the tuning logic.

7. The device of claim 5, wherein either or both of the tuning logic and the one or more processors are configured to implement a state machine governing selection of the tuning settings based on identification of the plurality of scenarios and a priority handling scheme for handling detection of multiple scenarios.

8. The device of claim 5, wherein the first transmission band is a Global System for Mobile Communications (GSM) transmission band, and wherein the connector is a USB connector and the communication port is a USB port.

9. The device of claim 5, wherein the input received by the one or more processors from the plurality of sources includes one or more of: sensor data from one or more sensors of the device, operational data from one or more subsystems of the device, or contextual data received from an operating system of the device or one or more remote devices.

10. The device of claim 5, wherein the input received by the one or more processors from a plurality of sources includes proximity sensor input from a proximity sensor of the device, and input from the communication port of the device indicating insertion of connector into the communication port, and wherein the tuning logic is configured to disregard the proximity sensor input when the connector is inserted in the communication port.

11. A device, comprising:
a Universal Serial Bus (USB) port configured to receive a USB connector;
a transmitter configured to generate a radio frequency (RF) signal in each of a plurality of transmission bands including a Global System for Mobile Communications (GSM) transmission band;
an antenna configured to transmit the RF signals generated by the transmitter, the antenna being configured such that, when the USB connector is inserted in the USB port, a transmission efficiency of the antenna in the GSM transmission band is increased by electromagnetic coupling between the antenna and the USB connector;
a variable impedance component coupled to the antenna and configured to modify an impedance of the antenna; and
tuning logic configured to tune the antenna by selecting from among a plurality of tuning settings for the variable impedance component, the plurality of tuning settings including a first tuning setting for when the USB connector is inserted in the USB port, wherein the first tuning setting tunes the antenna to attenuate harmonic energy of the RF signals outside of the GSM transmission band; and
one or more processors configured to determine when the USB connector is inserted in the USB port, and to provide input to the tuning logic to facilitate selection of the first tuning setting.

12. The device of claim 11, wherein the one or more processors are configured to run an operating system of the device, wherein the one or more processors include an auxiliary processor that operates when the operating system enters a dormant mode, and wherein both the operating system and the auxiliary processor are configured to communicate with the tuning logic.

13. The device of claim 11, wherein the one or more processors are further configured to receive input from a plurality of sources, to identify based on the input one or more scenarios from among a plurality of scenarios, each of the scenarios corresponding to one of the tuning settings, the plurality of tuning settings including the first tuning setting, the one or more processors being further configured to provide input to the tuning logic regarding the one or more identified scenarios to facilitate selection of a particular tuning setting corresponding to one of the one or more identified scenarios.

14. The device of claim 13, wherein the input received by the one or more processors from the plurality of sources includes one or more of: sensor data from one or more sensors of the device, operational data from one or more subsystems of the device, or contextual data received from an operating system of the device or one or more remote devices.

15. The device of claim 13, wherein the one or more processors are configured to run an operating system of the device, wherein the one or more processors include an auxiliary processor that operates when the operating system enters a dormant mode, and wherein the input received by the one or more processors from the plurality of sources includes proximity sensor input received by the auxiliary processor from a proximity sensor of the device, and input received by the operating system from the USB port indicating insertion of the USB connector into the USB port, and wherein the tuning logic is configured to disregard the proximity sensor input when the USB connector is inserted in the USB port.

16. The device of claim 11, wherein either or both of the tuning logic and the one or more processors are configured to implement a state machine governing selection of the tuning settings based on identification of the plurality of scenarios and a priority handling scheme for handling detection of multiple scenarios.

17. The device of claim 11, wherein the transmitter is configured to generate a first RF signal in the GSM transmission band having a fundamental frequency at 850 MHz.

18. The device of claim 11, wherein the variable impedance component includes a configurable bank of capacitors.

* * * * *